United States Patent [19]

Watanabe et al.

[11] Patent Number: 5,139,316
[45] Date of Patent: Aug. 18, 1992

[54] TANDEM LIQUID PRESSURE CONTROL DEVICE FOR AN ANTI-LOCK BRAKE

[75] Inventors: Mamoru Watanabe, Kawaguchi; Yasuhiro Miyama, Hunabashi, both of Japan

[73] Assignee: Miyako Jidosha Kogyo Kabushikigaisha, Tokyo, Japan

[21] Appl. No.: 571,168

[22] Filed: Aug. 21, 1990

[30] Foreign Application Priority Data

Aug. 22, 1989 [JP] Japan ................. 1-214215

[51] Int. Cl.$^5$ .................. B60T 8/40; B60T 8/66
[52] U.S. Cl. .................. 303/119 SV; 303/113 AP; 303/115 R
[58] Field of Search .............. 303/115, 119, 84.1, 303/113, 116, 115 R, 115 VM, 119 SV, 116 R, 113 AP, 113 R

[56] References Cited

U.S. PATENT DOCUMENTS

| | | | |
|---|---|---|---|
| 3,989,313 | 2/1976 | Toms | 303/113 |
| 4,600,245 | 7/1986 | Watanabe | 303/119 X |
| 4,890,890 | 1/1990 | Leiber | 303/113 X |

FOREIGN PATENT DOCUMENTS

1256966 7/1989 Canada.

*Primary Examiner*—Matthew C. Graham
*Assistant Examiner*—Josie A. Ballato
*Attorney, Agent, or Firm*—Collard & Roe

[57] ABSTRACT

A tandem liquid pressure control device for an anti-lock brake system includes a tandem liquid pressure control cylinder disposed between a tandem master cylinder and the vehicle brakes, and a mechanism for driving the liquid pressure control means for movement in a direction causing a reduction or elevation in braking liquid pressure for an anti-lock operation. The liquid pressure control cylinder contains a first liquid pressure control piston adapted to be driven by the driving mechanism for movement in the direction causing pressure reduction or elevation and a second liquid pressure control piston mounted coaxially with the first piston and movably in a floating way, and defines a first and a second liquid pressure control chambers in which the pressures of the braking liquid are controlled by the movement of the first and second pistons. A solenoid valve is provided for cutting off the supply of the braking liquid from the chambers of the master cylinder to the brakes through the first and second liquid pressure control chambers in response to a cutoff signal inputted from an external source, before the first and second pistons are moved.

3 Claims, 6 Drawing Sheets

TANDEM LIQUID PRESSURE CONTROL DEVICE FOR AN ANTI-LOCK BRAKE

BACKGROUND OF THE INVENTION

1. Field of the Invention

This invention relates to an improvement in the tandem liquid pressure control device for an anti-lock brake which is used in a motor vehicle, etc.

2. Description of the Prior Art

If the wheels of a motor vehicle are locked by receiving an excessively large braking force as compared with the force of friction occurring between the rim surfaces of the tires and the ground surface, there is every likelihood that a dangerous situation may arise, as the vehicle requires a longer distance before stopping, or it loses its directional stability or proper steerability.

Various kinds of liquid pressure control devices for anti-lock brakes have been proposed to prevent such wheel locking. This type of device mainly comprises a sensor for detecting an increase or decrease in the rotational speed of the wheels, and a control unit adapted for receiving the output of the sensor and producing an appropriate output signal to cause a reduction or rise in the pressure of a liquid which is applied to the distal ends of the brake system.

Figure 7:
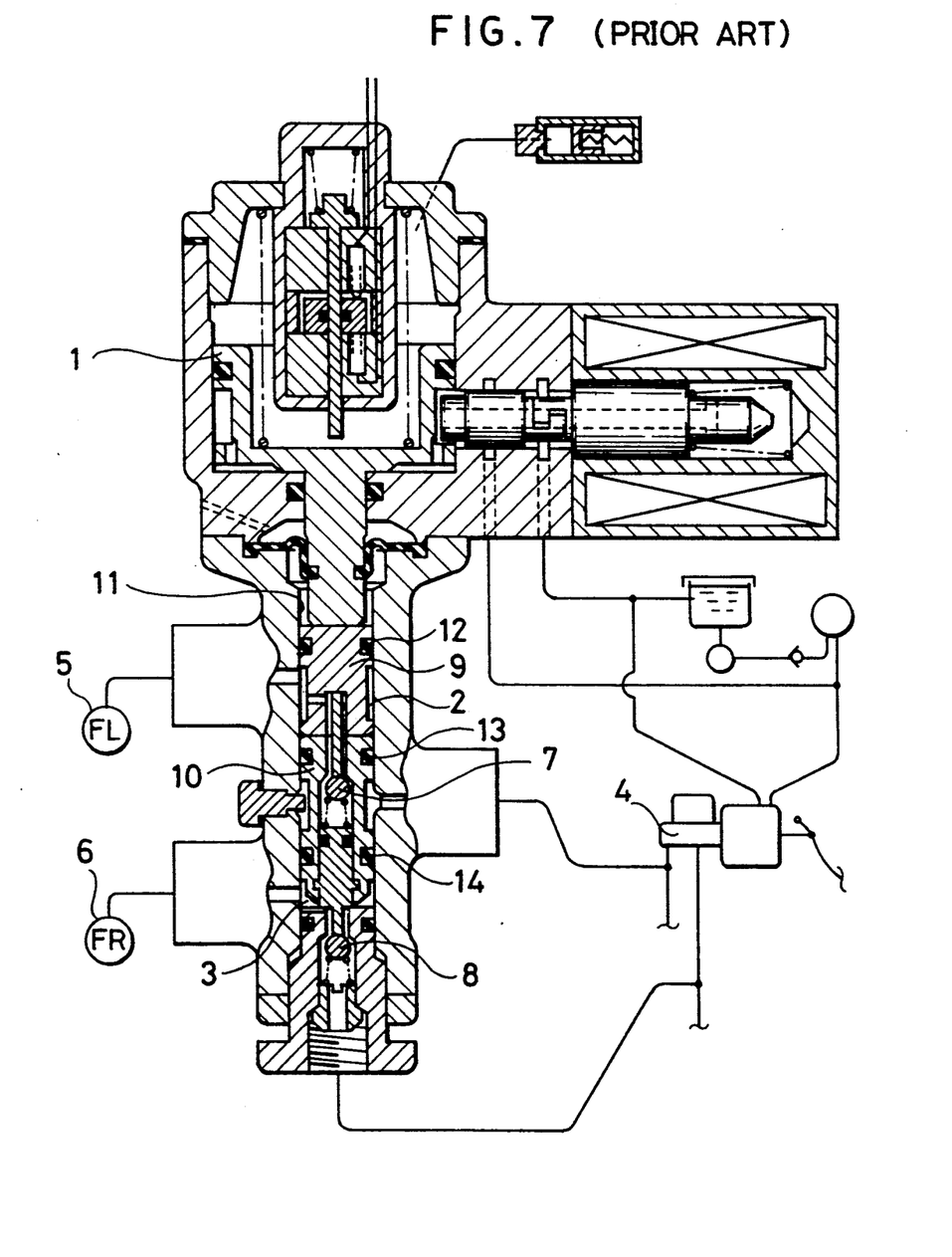
FIG. 7 is a sectional view of a device known in the art.

Canadian Patent No. 1,256,966 discloses a liquid pressure control device for an anti-lock brake which is constructed as shown in FIG. 7 of the accompanying drawings. This device has the advantage that the liquid pressures of the first and second liquid pressure control chambers 2 and 3 forming a tandem arrangement can be controlled simultaneously by a single differential pressure-responding member (driving member) 1. The first and second control valves 7 and 8 which are closed to cut off the supply of liquid pressure from the tandem master cylinder 4 to the front left wheel brake 5 (one of the distal ends of the brake system) and the front right wheel brake 6 (the other distal end of the brake system), respectively, are, however, operationally connected with the liquid pressure control piston 9 (first liquid pressure control piston) and the floating piston 10 (second liquid pressure control piston), respectively. The sequence of the anti-lock operation by the device is, therefore, such that it is only after the upward movement of the differential pressure-responding member 1 and the subsequent upward movement of the liquid pressure control piston 9 and the floating piston 1 that the first and second control valves 7 and 8 are closed.

This arrangement gives rise to a number of problems. If there is a great delay in the response of the differential pressure-responding member 1 which initiates the anti-lock operation, and if the tandem master cylinder 4 has a high rate of liquid supply, the first and second liquid pressure control chambers 2 and 3 and the front left and right wheel brakes 5 and 6 have a great increase in liquid pressure before the first and second control valves 7 and 8 are closed. If the seals 12, 13 and 14 slidably provided about the liquid pressure control piston 9 and the floating piston 10 along the inner wall surface of the braking liquid pressure controlling cylinder 11 are of the V-shaped type, the increase in liquid pressure of the first and second liquid pressure control chambers 2 and 3 brings about an increase in sliding resistance of the seals 12 to 14 to the extent that the liquid pressure control piston 9 and the floating piston 10 fail to follow quickly the vertical movement of the differential pressure-responding member 1. The failure of the floating piston 10 to follow the movement of the differential pressure-responding member 1 leads to a delay in the recovery of a balance of liquid pressure between the first and second liquid pressure control chambers 2 and 3 and in the opening or closing of the first and second control valves 7 and 8. This delay combines with the delay in response of the differential pressure-responding member 1 and makes it still more difficult for the device to achieve any satisfactorily quick control of the liquid pressure which is applied to the brakes.

SUMMARY OF THE INVENTION

It is therefore an object of this invention to provide an improved tandem liquid pressure control device for an anti-lock brake which makes it possible to avoid any undesirable rise in liquid pressure at the distal ends of the brake system even if there may occur any delay in response of the driving means for initiating an anti-lock operation, and enables the first and second liquid pressure control pistons to move quickly with the movement of the driving means.

According to one embodiment of this invention, the device includes solenoid valve means adapted for cutting off the supply of a braking fluid from the liquid chambers of a tandem master cylinder to the wheel brakes through first and second liquid pressure control chambers in response to a cutoff signal inputted to it from an external source. The solenoid valve means cuts off the fluid communication between the liquid chambers of the tandem master cylinder and the first and second liquid pressure control chambers, respectively, before the first and second liquid pressure control pistons are caused to move. Therefore, it is possible to avoid any undesirable rise in liquid pressure at the wheel brakes even if there may occur any delay in response of the driving means for initiating the anti-lock operation, and improve the quickness of movement of the first and second liquid pressure control pistons with the movement of the driving means.

According to another embodiment of this invention, the device includes solenoid valve means adapted for cutting off the supply of a braking fluid from one of the liquid chambers of a tandem master cylinder to the wheel brakes through a first liquid pressure control chamber in response to a cutoff signal inputted to it from an external source. The solenoid valve means cuts off the fluid communication between one of the liquid chambers of the tandem master cylinder and the first liquid pressure control chamber in which the liquid pressure has a significant bearing on the increase in sliding resistance of piston seals. Therefore, it is possible to avoid any undesirable rise in liquid pressure at the wheel brakes, particularly one which is more likely to bring about an increase in sliding resistance of the piston seals, even if there may occur any delay in response of the driving means for initiating the anti-lock operation, and improve the quickness of movement of the first and second liquid pressure control pistons with the movement of the driving means.

According to still another embodiment of this invention, the device includes solenoid valve means provided between a port connected to one of the liquid chambers of a tandem master cylinder and a first liquid pressure control chamber for cutting off the supply of a braking fluid through the first liquid pressure control chamber, and having a movable core terminating in a projection adapted for staying in the first liquid pressure control chamber to hold the first liquid pressure control piston against movement in the direction causing a reduction in liquid pressure, as long as the solenoid valve means remains unenergized. Before the first and second liquid pressure control pistons are driven for movement, the solenoid valve means at least cuts off the fluid communication between one of the liquid chambers of the tandem master cylinder and the first liquid pressure control chamber, and prevents the expansion of the first and second liquid pressure control chambers, as long as it remains unenergized. It is, therefore, possible to avoid any undesirable rise in liquid pressure at the wheel brakes even if there may occur any delay in response of the driving means for initiating the anti-lock operation, and improve the quickness of movement of the first and second liquid pressure control pistons with the movement of the driving means. This also ensures the maintenance of an appropriate braking force and thereby improves the safety of the vehicle, even if the driving means may have got out of order.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
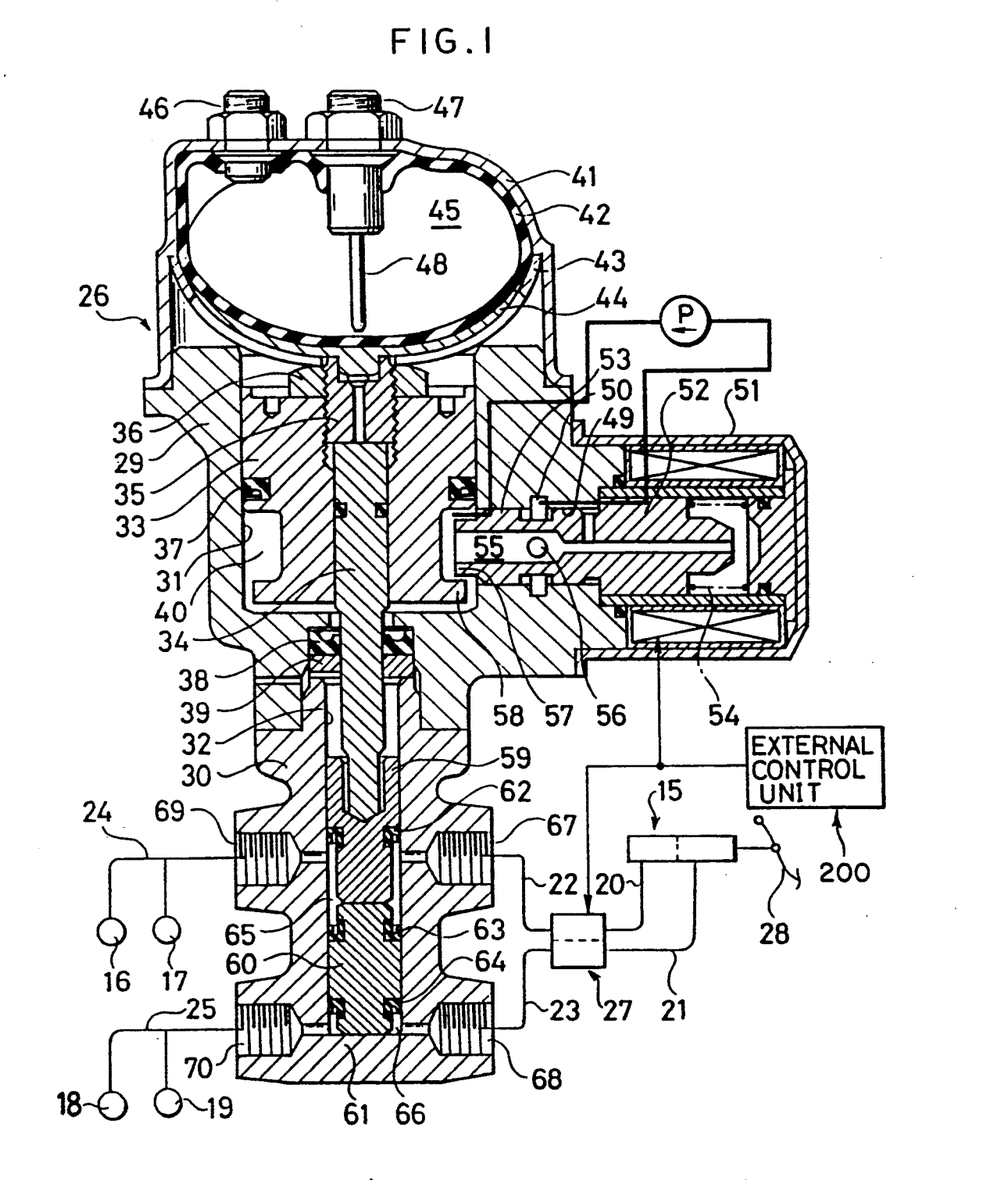
FIG. 1 is a sectional view of a device embodying the present invention.

A preferred embodiment of this invention is shown in FIG. 1. A tandem liquid pressure control device 26 for an anti-lock brake and a double-core cut-off solenoid 27 are connected between a tandem master cylinder 15 and wheel brakes 16 to 19 by brake lines or pipes 20 to 25. The cut off solenoid 27 forms a part of the device 26. A brake pedal is shown at 28.

The tandem liquid pressure control device 26 includes a unitary assembly of a driving cylinder body 29 and a liquid pressure control cylinder body 30. The driving cylinder body 29 defines a driving cylinder 31, while the liquid pressure control cylinder body 30 defines a liquid pressure control cylinder 3 which is coaxial with the driving cylinder 31.

A differential pressure-responding piston 33 is vertically movably disposed in the driving cylinder 31 and a drive rod 34 extends axially through the piston 33. Drive rod 34 has an upper end contacting the lower end of an adjusting bolt 35 which can be turned to adjust the position of the piston 33 in its inoperative position with respect to the left end of spool valve 53. A lock nut is shown at 36. The piston 33 is provided with an annular seal 37 having an outer peripheral surface kept in sliding contact with the inner wall surface of the driving cylinder 31. The driving cylinder body 29 is provided near its lower end with an annular seal 38 having an inner peripheral surface kept in sliding contact with the outer surface of the drive rod 34. A seal retainer 39 is provided for the seal 38. The driving cylinder 31 defines a driving liquid pressure chamber 40 between the seals 37 and 38.

Figure 5:
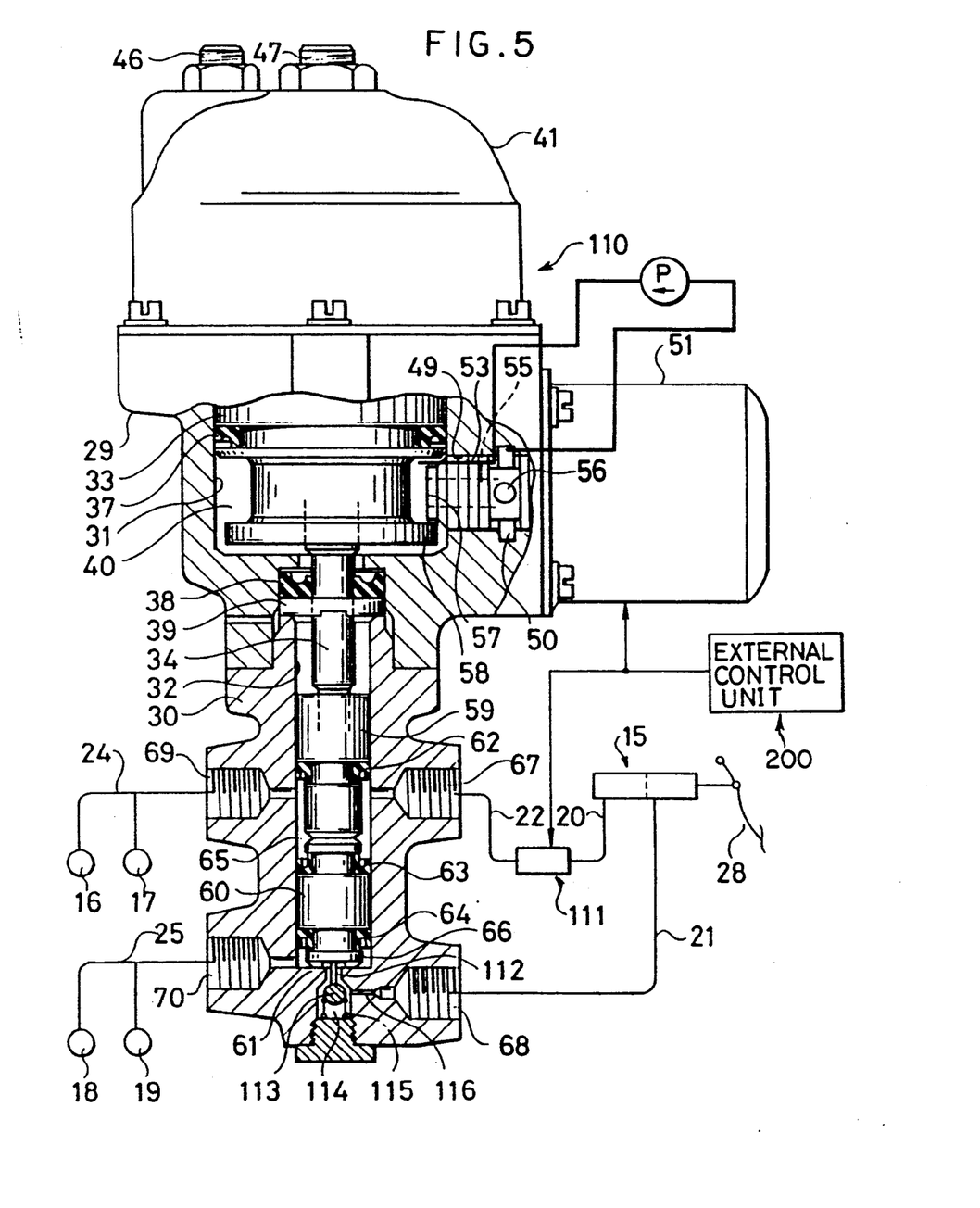
FIG. 5 is a sectional view of another device embodying this invention.
Figure 6:
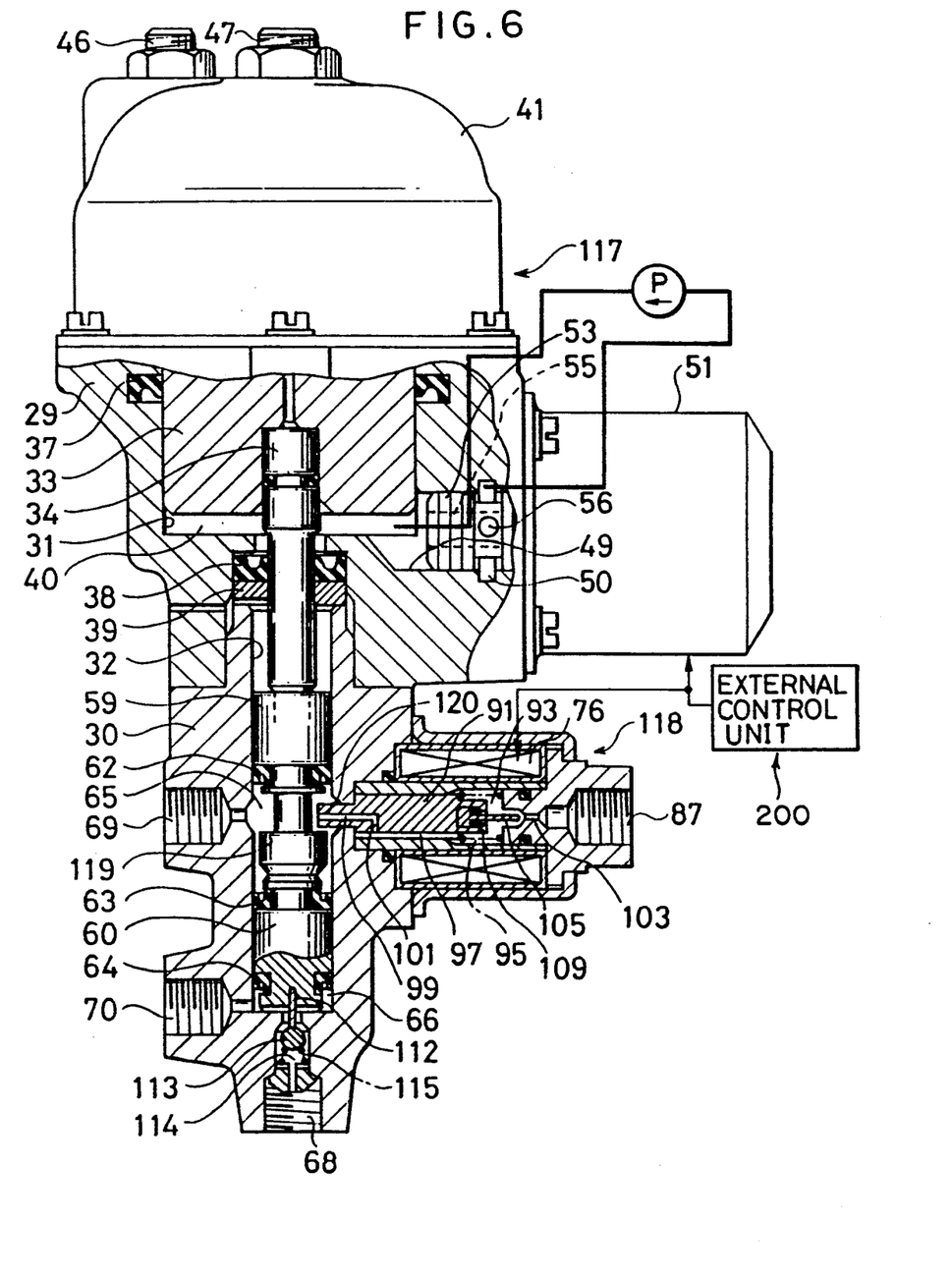
FIG. 6 is a sectional view of still another device embodying this invention.

A rigid bowl-shaped shell 41 as shown in FIGS. 1, 5 and 6 is provided on the top of the driving cylinder body 29. Shell 41 contains a pneumatic pressure sealing member 42 and an elastic shell 43 (internal features not shown in FIGS. 5 and 6). A sheet member 44 is disposed between the pneumatic pressure sealing member 42 and the elastic shell 43. The pneumatic pressure sealing member 42 has a pneumatic pressure chamber 45 in which air having a predetermined pressure is confined. The pneumatic pressure in the pneumatic pressure chamber 45 and the spring force of the elastic shell 43 act upon the lock nut 36 and thereby urge the differential pressure-responding piston 33 downwardly. A plug 46 is provided for supplying air into the pneumatic pressure chamber 45. A sensor 47 having an extensible contact member 48 is provided for detecting the displacement of the elastic shell 43 and the upward movement of the piston 33, as well as any variation of pneumatic pressure in the pneumatic pressure chamber 45 to below its predetermined level. The contact member 48 has a lower end spaced slightly apart from the inner wall of the pneumatic pressure sealing member 42 to ensure that the sensor 47 be kept in its inoperative or OFF position when the piston 33 stays in its retracted position as shown in FIG. 1.

The spool valve 53 is provided on the right side of the driving cylinder body 29 and is movable laterally to and away from the differential pressure-responding piston 33. The driving cylinder body 29 is formed in its side wall with a valve cylinder 49 having a longitudinal axis which is perpendicular to the axis of movement of the piston 33, and with an annular liquid pressure relief groove 50. The spool valve 53 is axially movably disposed in the valve cylinder 49 and composed integrally with the movable core 52 of a drive or driving solenoid 51. The drive solenoid 51 is energized or deenergized by an external control unit 200. A spring 54 is provided for holding the movable core 52 in its retracted position as shown in FIG. 1. The spool valve 53 has a liquid passage 55 and a small hole 56 which establish fluid communication between the driving liquid pressure chamber 40 and the liquid pressure relief groove 50, and is provided with a projection 57 at its left end. The projection 57 is engageable with the stop collar portion 58 of the piston 33 to prevent the upward movement of the piston 33 when the pneumatic pressure in the pneumatic pressure chamber 45 has dropped below its predetermined level as a result of some failure or other and the resulting operation of the sensor 47 has caused the external control unit 200 to prohibit the energization of the driving solenoid 51.

The driving liquid pressure chamber 40 is connected to the delivery port of a liquid pump used as a source of driving liquid pressure (but not shown), while the liquid pressure relief groove 50 is connected to its suction port.

The liquid pressure control cylinder 32 contains a first liquid pressure control piston 59 and a second liquid pressure control piston 60 which are arranged in tandem and are both vertically movable. The pistons 59 and 60, together with the differential pressure-responding piston 33, are urged against the closed bottom end 61 of the liquid pressure control cylinder 32 by the pneumatic pressure prevailing in the pneumatic pressure chamber 45 and the spring force of the elastic shell 43 which are transmitted through the lock nut 36, the adjustment bolt 35, and the drive rod 34. The piston 59 is provided with an annular seal 62, and the piston 60 with annular seals 63 and 64, each seal being in sliding contact with the inner wall of the liquid pressure control cylinder 32. Each of the seals 62 to 64 has a V-shaped section. The cylinder 32 defines a first liquid pressure control chamber 65 between the seals 62 and 63, and a second liquid pressure control chamber 66 between the seal 64 and the closed bottom end 61. The brake lines 22 to 25 are connected with ports 67 to 70, respectively.

Figure 2:
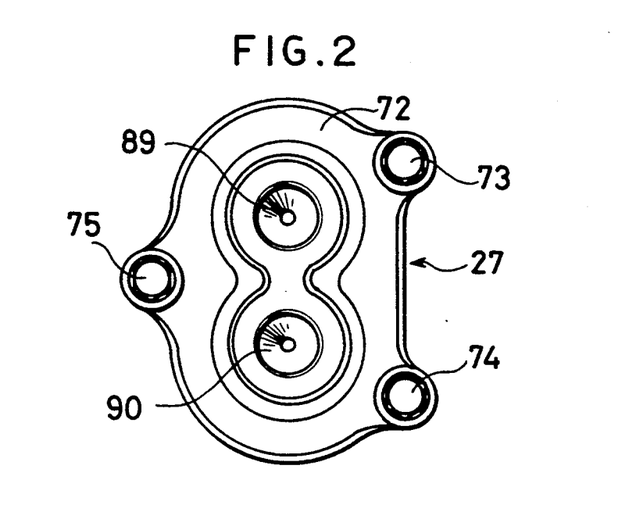
FIG. 2 is an enlarged side elevational view of a part of the device shown in FIG. 1.
Figure 3:
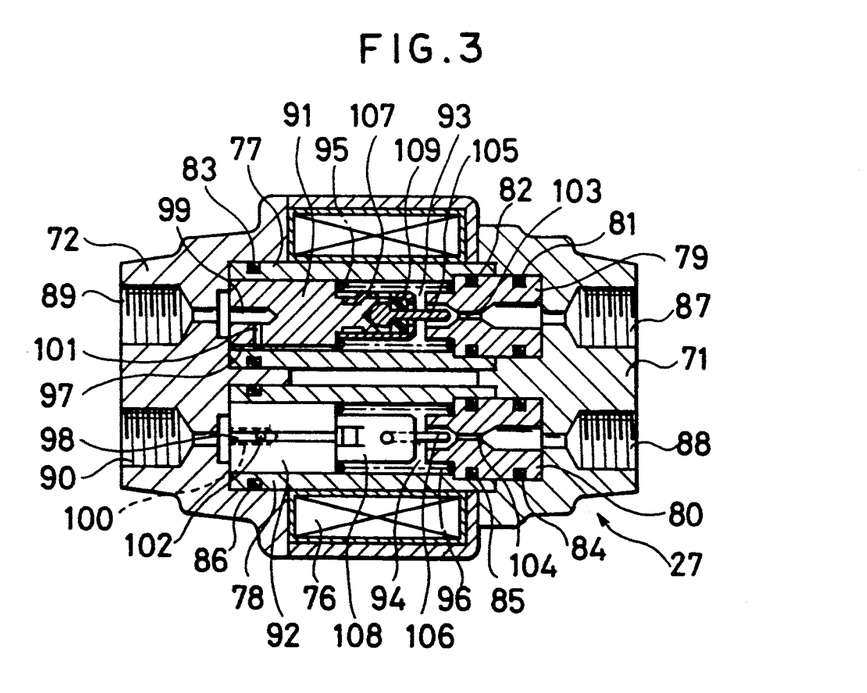
FIG. 3 is a sectional view of the part shown in FIG. 2.

Referring now in detail to FIG. 2 is a side elevational view of the cutoff solenoid 27 shown in FIG. 1, and FIG. 3 is a longitudinal sectional view thereof, an inlet casing 71 and an outlet casing 72 are joined to each other by bolts 73 to 75 and a solenoid coil 76 wound in a substantially oval shape is disposed therebetween. A first and a second guide cylinders 77 and 78 lying one above the other and in parallel to each other and a first and a second stationary cores 79 and 80 lying one above the other and in parallel to each other are secured between the inlet and outlet casings 71 and 72 and are surrounded by the coil 76. Fixed annular seals are shown at 81 to 86. The brake lines 20 to 23 (FIG. 1) are connected with ports 87 to 90, respectively.

A first and a second movable cores 91 and 92 having the same shape are located in the first and second guide cylinders 77 and 78, respectively, and are each movable horizontally, or axially of the guide cylinder 77 or 78. A first liquid chamber 93 is defined between the first stationary core 79 and the first movable core 91, and a second liquid chamber 94 between the second stationary core 80 and the second movable core 92. A spring 95 is provided in the first liquid chamber 93 for holding the movable core 91 in its retracted position as shown in FIG. 3, and another spring 96 in the second liquid chamber 94 for holding the movable core 92 in its retracted position as shown. The first movable core 91 is provided with a groove 97 and small holes 99 and 101 which define a liquid passage, and the second movable core 92 is likewise provided with a groove 98 and small hole 100 and 102 which define a liquid passage. The first movable core 91 is provided at its right end with a first needle valve 105 adapted for opening or closing a small hole 103 formed in the first stationary core 79, while the second movable core 92 is provided at its right end with a second needle valve 106 adapted for opening or closing a small hole 104 formed in the second stationary core 80. The needle valves 105 and 106 are of the same shape. The first needle valve 105 is supported by a retainer 107 and an elastic ring 109 on the first movable core 91 and the second needle valve 106 is supported by a retainer 108 and an elastic ring (not shown) on the second movable core 92. The two retainers are of the same shape; the same is true for the two elastic rings. Both of the needle valves 105 and 106 are slightly rotatably supported, so that each valve 105 or 106 can properly close the hole 103 or 104, even if it may become slightly eccentric to the hole.

Figure 4:
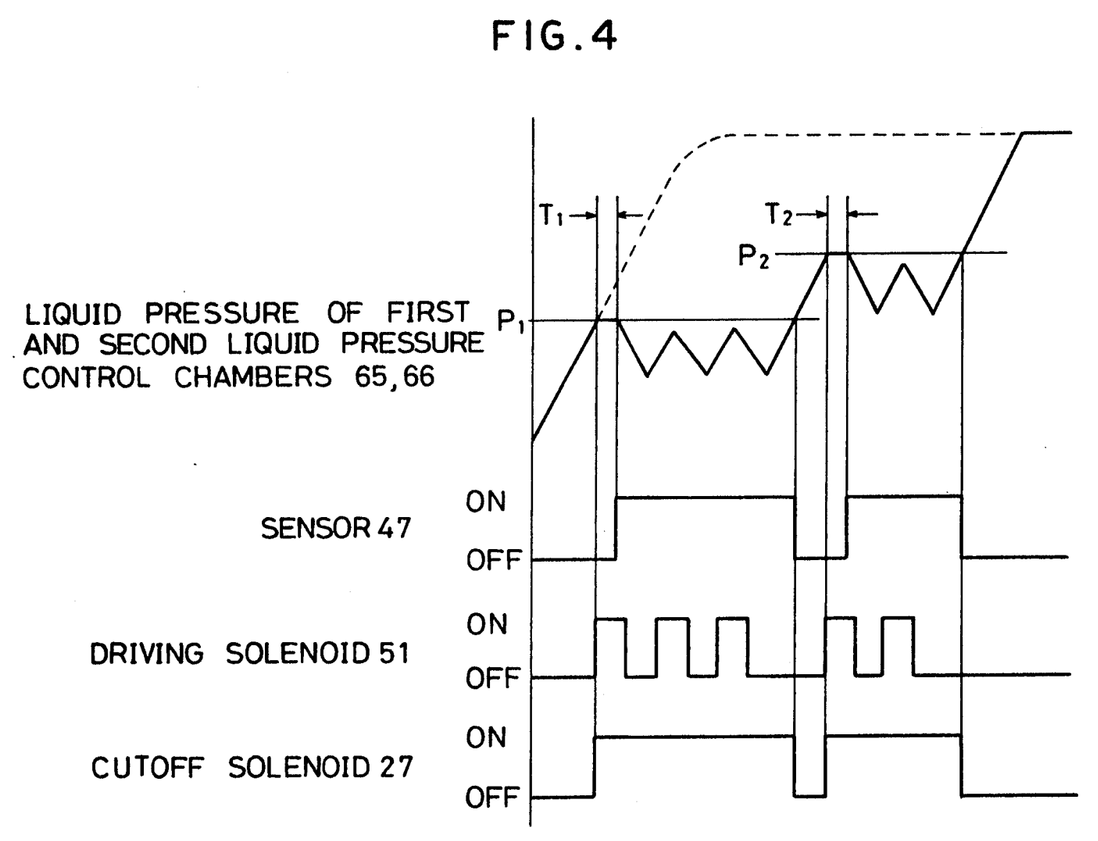
FIG. 4 is a time chart showing by way of example the operation of the device shown in FIGS. 1 to 3.

FIG. 4 is a time chart showing by way of example the operation of the device which has been described with reference to FIGS. 1 to 3. The operation of the device will now be described with reference to FIG. 4.

When the brake pedal 28 is at rest, the differential pressure-responding piston 33 is urged downwardly by the pressure of the compressed air in the pneumatic pressure sealing member 42 and the spring force of the elastic shell 43, and the first liquid pressure control piston 59 remains in contact with the second liquid pressure control piston 60 and holds it against the closed bottom end 61 of the cylinder 32. The spool valve 53 and the first and second needle valves 105 and 106 remain in their respective retracted positions as shown in FIGS. 1 and 3, so that fluid communication is maintained between the driving liquid pressure chamber 40 and the liquid pressure relief groove 50, as well as between the tandem master cylinder 15 and the wheel brakes 16 to 19.

If the brake pedal 28 is depressed by the driver of a running vehicle, the tandem master cylinder 15 creates liquid pressure in two circuits, i.e. a first circuit leading to the wheel brakes 16 and 17 through the brake line 20, port 87, hole 103, first liquid chamber 93, groove 97, holes 101 and 99, port 89, brake line 22, port 67, first liquid pressure control chamber 65, port 69 and brake line 24, and a second circuit leading to the wheel brakes 18 and 19 through the brake line 21, port 88, hole 104, second liquid chamber 94, groove 98, holes 102 and 100, port 90, brake line 23, port 68, second liquid pressure control chamber 66, port 70 and brake line 25, so that the simultaneous braking operation is performed through the two circuits. Although the pressure of the liquid in the first and second liquid pressure control chambers 65 and 66 is raised as a result of the braking operation and urges the first and second liquid pressure control pistons 59 and 60 upwardly, the pressure of the compressed air in the pneumatic pressure chamber 45 and the spring force of the elastic shell 43 overcome the liquid pressure and maintain the pistons 59 and 60 in their retracted positions as shown in FIG. 1.

If a cutoff signal and a pressure reduction signal are outputted by the external control unit (not shown) to start an anti-lock operation, the cutoff and driving solenoids 27 and 51 are actuated simultaneously, or the solenoid 27 somewhat earlier than the solenoid 51. At this time the liquid pump (not shown) is also actuated.

If the cutoff solenoid 27 is actuated, the solenoid coil 76 is energized and causes the first and second movable cores 91 and 92 to move to the right by overcoming the force of the springs 95 and 96, respectively, so that the holes 103 and 104 are simultaneously closed by the first and second needle valves 105 and 106, respectively. As a result of the closure of the holes 103 and 104, the liquid pressure between the tandem master cylinder 15 and the cutoff solenoid 27 rises as shown by a broken line in FIG. 4, but the liquid pressure prevailing in the circuit portions between the solenoid 27 and the wheel brakes 16 to 19 and including the first and second liquid pressure control chambers 65 and 66 is kept at a certain level P as shown by a solid line.

The actuation or energization of the driving solenoid 51 causes the movable core 52 to move to the right by overcoming the force of the spring 54, so that the liquid pressure relief groove 50 is closed by the spool valve 53. As a result, the driving liquid pressure which is supplied from the liquid pump (not shown) to the driving liquid pressure chamber 40 causes the differential pressure-responding piston 33 and the drive rod 34 to move upwardly by overcoming the pressure of the compressed air in the pneumatic pressure chamber 45 and the spring force of the elastic shell 43. After the driving solenoid 51 has been energized, there is a delay of time before the sensor 47 is actuated by the upward movement of the piston 33. This delay is shown at $T_1$ in FIG. 4. The upward movement of the drive rod 34 with the piston 33 relieves the first and second liquid pressure control pistons 59 and 60 from the force urging them downwardly and the first and second liquid pressure control chambers 65 and 66 are, therefore, allowed to expand. As a result, a reduction is achieved in the liquid pressure prevailing in the liquid pressure control chambers 65 and 66 and reaching the wheel brakes 16 to 19, so that no brake locking occurs. The pressure reducing operation which has been described is followed by the deenergization and energization of the driving solenoid 51 responding to a pressure raise or reduction signal outputted by the control unit, as the case may be, whereby the liquid pressure reaching the brakes is controlled.

If, for example, a change in the condition of the road surface has resulted in the necessity for the anti-lock operation at a braking liquid pressure P, which is higher than $P_1$, the driving solenoid 51 is deenergized to allow the spool valve 53 to move back to its retracted position, so that the liquid pressure relief groove 50 is opened to release the driving liquid from the driving liquid pressure chamber 40. As a result of the disappearance of the driving liquid pressure, the differential pressure-responding piston 33 is pushed down by the pressure of the compressed air in the pneumatic pressure chamber 45 and the spring force of the elastic shell 43, and the first and second liquid pressure control pistons 59 and 60 are pushed down by the drive rod 34, so that the first and second liquid pressure control chambers 65 and 66 are reduced in volume to raise the braking liquid pressure to the level $P_1$. As a result of the retraction of the piston 33, the drive rod 34 and the pistons 59 and 60 to their respective positions shown in FIG. 1, the contact member 48 is slightly spaced apart from the inner wall of the pneumatic pressure sealing member 42 and the sensor 47 is, therefore, turned off.

As soon as the sensor 47 is turned off, the control unit ceases to output the cutoff signal and the coil 76 of the cutoff solenoid 27 is, therefore, deenergized. As a result, the first and second movable cores 91 and 92 and hence the needle valves 105 and 106 are retracted to the left and the holes 103 and 104 are, therefore, opened to permit the flow therethrough of the braking liquid from the tandem master cylinder 15.

When the braking liquid pressure has been raised to the level $P_2$, the control unit outputs a cutoff signal and a pressure reduction signal again, so that the cutoff and driving solenoids 27 and 51 are energized. After a delay of time $T_2$, the cutoff solenoid 27 remains energized and the driving solenoid 51 is alternately energized and deenergized to effect the continuous control of the liquid pressure until the anti-lock operation is discontinued.

As the energization of the cutoff solenoid 27 is made earlier than the initial upward movement of the differential pressure-responding piston 33 (pressure-reducing operation), it is possible to prevent the supply of any excessively high braking liquid pressure that makes the anti-lock operation of no use and brings about an increase in sliding resistance of the seals 62 to 64. This enables the quick floating motion of the second liquid pressure control piston 60 in response to variations in the pressure of the braking liquid in the first and second liquid pressure control chambers 65 and 66, as well as the desired anti-lock operation, even if the delays $T_1$ and $T_2$ in motion of the first and second liquid pressure control pistons 59 and 60 may be prolonged. Insofar as no excessively high braking liquid pressure occurs, even the upward movement of the piston 33 over a small distance enables a satisfactory reduction in liquid pressure. This enables a reduction in the amount of the driving liquid which is supplied to the driving liquid pressure chamber 40 for driving the piston 33, so that it is sufficient to use a small pump as a source of driving liquid supply.

Reference is now made to FIG. 5 showing another embodiment of this invention. The tandem liquid pressure control device 110 for an anti-lock brake which is shown in FIG. 5 differs from the device 26 shown in FIGS. 1 to 3 in that a single-circuit cutoff solenoid 111 is substituted for the double-circuit cutoff solenoid 27, and that the second needle valve 106 is replaced by a valve 113 which is so connected by a pin 112 to the second liquid pressure control piston 60 as to close or open with the upward or downward movement of the piston 60. The valve 113 is located in a valve chamber 114 formed below the second liquid pressure control chamber 66. A spring 115 is fastened to the valve 113 for urging it toward its open position.

The supply of the braking liquid from the tandem master cylinder 15 to the first liquid pressure control chamber 65 is cut off before the differential pressure-responding piston 33 is driven for starting a pressure reducing operation, as is the case with the device shown in FIGS. 1 to 3. This makes it possible to prevent any undesirable increase in sliding resistance of the seals 62 and 63, if the delay in response of the piston 33 (shown at $T_1$ or $T_2$ in FIG. 4) is not too long. This is particularly important for the seal 63 which tends to receive a greater amount of sliding resistance than the other seals 62 and 64, since it is required to perform its sealing function in the direction opposite to that in which it is caused to slide. The avoidance of any undesirable increase in sliding resistance of the seal 63 enables the quick movement of the second liquid pressure control piston 60 with the movement of the first liquid pressure control piston 59 and thereby the quick closing of the valve 113. The device of FIG. 5 is less expensive than the device 26 of FIGS. 1 to 3 including the double-circuit cutoff solenoid 27. An orifice 116 is advantageously formed as a liquid passage between the port 68 and the valve chamber 114 to prevent any excessively rapid supply of braking liquid from the tandem master cylinder 15 to the second liquid pressure control chamber 66.

FIG. 6 illustrates another embodiment of this invention. The tandem liquid pressure control device 117 for an anti-lock brake which is shown in FIG. 6 differs from the device 26 of FIGS. 1 to 3 and the device 110 of FIG. 5 in that a single-circuit cutoff solenoid 118 forms an integral part of the liquid pressure control cylinder body 30, that the first liquid pressure control piston 59 is formed with a stop shoulder 119 corresponding to the collar 58 on the differential pressure-responding piston 33, and that the movable core 91 is provided at its inner end with a projection 120 which extends into the first liquid pressure control chamber 65 for engagement with the shoulder 119.

If, as a result of the failure of the pneumatic pressure chamber 45 (FIG. 1) to maintain an appropriately high air pressure, the external control unit (not shown) has prohibited the actuation of the cutoff solenoid 118, the projection 120 engaging the stop shoulder 119 prevents the upward movement of the first and second liquid pressure control pistons 59 and 60, even if a usual braking operation may cause an increase in the pressure of the braking liquid in the first and second liquid pressure control chambers 65 and 66.

The device shown in FIG. 6 enables the elimination of the projection 57 on the spool valve 53 and the collar 58 on the piston 33. It also thereby enables the use of the piston 33 having a simplified shape, as well as the omission of the adjustment bolt 35 and the lock nut 36 which are no longer required for adjusting the position of the piston 33 relative to the spool valve 53. A greater extent of freedom is available in the selection of the position in which the driving solenoid 51 is mounted, and the device is, therefore, easier to adapt itself to the limited space which is available in a vehicle for its installation.

Although the differential pressure-responding piston 33 shown in FIGS. 1, 5 or 6 is of the type which is moved downwardly by the pressure of compressed air and the spring force of the elastic shell 43, and upwardly by the pressure of the driving liquid supplied to the driving liquid pressure chamber 40, it is alternately possible to use a known fluid pressure-driven servo or booster piston with a suitable valve substituted for the spool valve 53. The cutoff solenoid 27 or 111 can also be so constructed as to form an integral part of the liquid pressure control cylinder body 30 (see FIG. 6) or the tandem master cylinder 15. Although the cutoff solenoid 27 (and also 111 and 118) has been described as being energized in response to the output signal of the control unit and deenergized in response to the output signal of the sensor 47, it is alternately possible to omit the sensor 47 and adapt the cutoff solenoid to be both energized and deenergized in response to the output signals of the control unit.

Thus, while only three embodiments of the present invention have been shown and described, it is obvious that many changes and modifications may be made thereunto without departing from the spirit and scope of the invention.

What is claimed is:

1. A tandem liquid pressure control device for an anti-lock brake system having a tandem master cylinder having chambers for braking fluid and a plurality of brakes supplied with braking fluid from said master cylinder comprising:
   tandem liquid pressure control means disposed between said tandem master cylinder and said brakes;
   means for driving said liquid pressure control means to effect a reduction or elevation in liquid pressure for an anti-lock operation;
   said liquid pressure control means including a first liquid pressure control piston adapted to be driven by said driving means for movement in a direction causing said reduction or elevation, a second liquid pressure control piston mounted coaxially with said first piston and movably in a floating way, and a first and a second liquid pressure control chambers in which the pressures of a braking liquid are controlled by the movement of said first and second pistons; and
   solenoid valve means including a pair of movable cores, a pair of valves adapted to open upon movement of said cores, respectively, in one direction, and a common solenoid coil surrounding said cores for cutting off the supply of braking liquid from the chambers of said master cylinder to said brakes through said first and second liquid pressure control chambers in response to a cutoff signal inputted form an external source.

2. A tandem liquid pressure control device for an anti-lock brake system having a tandem master cylinder having chambers for braking fluid and a plurality of brakes supplied with braking fluid from said master cylinder comprising:
   tandem liquid pressure control means disposed between said tandem master cylinder and said brakes;
   means for driving said liquid pressure control means to effect a reduction or elevation in liquid pressure for an anti-lock operation;
   said liquid pressure control means including a first liquid pressure control piston adapted to be driven by said driving means for movement in a direction causing said reduction or elevation, a second liquid pressure control piston mounted coaxially with said first piston and movably in a floating way, and a first and a second liquid pressure control chambers in which the pressures of a braking liquid are controlled by the movement of said first and second pistons, and wherein said liquid pressure control means has therein a port connected to said one chamber of said master cylinder; and
   solenoid valve means positioned between said first liquid pressure control chamber and said port for cutting off the supply of braking liquid from the chambers of said master cylinder to said brakes through said first and second liquid pressure control chambers in response to a cutoff signal inputted from an external source, and wherein said solenoid valve means has a movable core provided at an end thereof with a projection which extends into said first liquid pressure control chamber and is engageable with said first liquid pressure control piston to prevent its movement in the direction causing said reduction.

3. A tandem liquid pressure control device for an anti-lock brake system having a tandem master cylinder having chambers for braking fluid and a plurality of brakes supplied with braking fluid from said master cylinder comprising:
   tandem liquid pressure control means disposed between said tandem master cylinder and said brakes;
   means for driving said liquid pressure control means to effect a reduction or elevation in liquid pressure for an anti-lock operation;
   said liquid pressure control means including a first liquid pressure control piston adapted to be driven by said driving means for movement in a direction causing said reduction or elevation, a second liquid pressure control piston mounted coaxially with said first piston and movably in a floating way, and a first and a second liquid pressure control chambers in which the pressures of a braking liquid are controlled by the movement of said first and second pistons, and wherein said liquid pressure control means has formed therein a port connected to said one chamber of said master cylinder;
   solenoid valve means positioned between said first liquid pressure control chamber and said port for cutting off the supply of said braking liquid from one of said chambers of said master cylinder to at least one of said brakes through said first liquid pressure control chamber in response to a cutoff signal inputted form an external source, wherein said solenoid valve means has a movable core provided at an end thereof with a projection which extends into said first liquid pressure control chamber and is engageable with said first liquid pressure control piston to prevent its movement in the direction causing said reduction; and valve means for cutting off the supply of said braking liquid from the other chamber of said master cylinder to the rest of said brakes through said second liquid pressure control chamber in response to the movement of said second liquid pressure control piston in the direction causing said reduction in liquid pressure.

* * * * *